United States Patent [19]

Shikichi

[11] Patent Number: 5,029,151
[45] Date of Patent: Jul. 2, 1991

[54] OPTICAL INFORMATION PROCESSING APPARATUS INCLUDING A LIMITER FOR LIMITING ERROR OF FOCUSING AND/OR TRACKING ACTUATORS AND A CIRCUIT FOR ADJUSTING THE LIMIT RANGE THEREOF

[75] Inventor: Satoshi Shikichi, Tokyo, Japan

[73] Assignee: Canon Kabushiki Kaisha, Tokyo, Japan

[21] Appl. No.: 310,196

[22] Filed: Feb. 14, 1989

[30] Foreign Application Priority Data

Feb. 17, 1988 [JP] Japan ................................. 63-32829

[51] Int. Cl.⁵ ............................................... G11B 7/00
[52] U.S. Cl. ................................ 369/44.35; 369/124; 369/44.29
[58] Field of Search ................... 369/44, 54, 111, 112, 369/43, 45, 46, 124, 44.29, 44.32, 44.25, 44.24–44.28, 43; 235/476; 358/907, 342; 250/201.1, 201.4, 201.5; 330/96, 69, 102, 105

[56] References Cited

U.S. PATENT DOCUMENTS

| | | | |
|---|---|---|---|
| 4,561,080 | 12/1985 | Yomazaki | 369/44.25 |
| 4,805,163 | 3/1989 | Ohntiki | 369/44.32 |
| 4,853,917 | 8/1989 | Koyama et al. | 369/44 |
| 4,860,271 | 8/1989 | Yokogawa et al. | 369/44.25 |
| 4,888,756 | 12/1989 | Shikichi et al. | 369/44.35 |
| 4,974,221 | 11/1990 | Hosuya et al. | 369/44.35 |

*Primary Examiner*—Roy N. Envall, Jr.
*Assistant Examiner*—Phang V. Tran
*Attorney, Agent, or Firm*—Fitzpatrick, Cella, Harper & Scinto

[57] ABSTRACT

An optical information processing apparatus includes a scanning device for scanning an information track on an optical recording medium by a focused light spot, a moving device for moving the light spot in the direction of an optical axis of the scanning device and/or in a direction which is perpendicular to the optical axis with respect to the information track, a detecting device for detecting focusing and/or tracking error signals of the light spot with respect to the information track, a control device for returning the detected error signal to the moving device, a limiting device for electrically limiting a range of movement of the light spot, and an adjusting device for adjusting the range of movement of the light spot which is limited by the control device in accordance with a sensitivity of the moving device.

10 Claims, 6 Drawing Sheets

OPTICAL INFORMATION PROCESSING APPARATUS INCLUDING A LIMITER FOR LIMITING ERROR OF FOCUSING AND/OR TRACKING ACTUATORS AND A CIRCUIT FOR ADJUSTING THE LIMIT RANGE THEREOF

BACKGROUND OF THE INVENTION

1. Field of the Invention

The present invention relates to an optical information processing apparatus in which an optical recording medium is scanned by a focused light beam and information is recorded thereon and/or reproduced therefrom.

2. Related Background Art

Hitherto, various kinds of media, such as the disk type, card type, tape type, and the like have been known as forms of recording media to record information thereon, and to read out the recorded information therefrom, by using light beams. Among them, the demand for an optical information recording medium formed in a card shape (hereinafter, referred to as an "optical card") is increasing more and more as a small-sized and light-weight portable medium having a large memory capacity.

FIG. 1 is a schematic plan view of such an optical card 101. Reference numeral 102 denotes an information recording area; 103 indicates an information track; reference numerals 104 and 104' denote track selecting areas; and reference numeral 105 indicates a home position of a light spot.

Information is recorded as an optically detectable recording bit train (information tracks) on the optical card 101 by scanning by a light beam modulated in accordance with recording information and focused to a micro spot. In this case, to accurately record information without causing any difficulty such as crossing of information tracks or the like, the irradiating position of the light spot needs to be controlled (auto tracking; hereinafter, referred to as an "AT") on the optical card surface in a direction perpendicular to the scanning direction. On the other hand, in order to irradiate the light spot as a micro spot of a stable size irrespective of any bending or mechanical error of an optical card, it is necessary to control auto focusing (hereinafter, referred to as an "AF") in the direction perpendicular to the optical card surface. In addition, the AT and AF are also necessary in the reproducing mode.

FIG. 2 shows a constructional diagram of an apparatus for recording information onto and reproducing information from an optical card. Reference numeral 106 denotes a motor to drive the optical card 101 in the directions indicated in the diagram by the double-head arrow 107 is a light source such as a semiconductor laser; 108 a collimating lens to convert the light from the light source 107 into the parallel light beam; 109 a beam splitter; 110 an objective lens; 111 a tracking coil; 112 a focusing coil; 113 and 114 condenser lenses; 115 and 116 photoelectric converting elements for tracking signal detection and for focusing signal detection; 117 a tracking controlling circuit; and 118 a focusing controlling circuit. The coils 111 and 112 are combined with magnets (not shown) and construct a tracking actuator and a focusing actuator, respectively. Currents are allowed to flow through the tracking coil 111 and focusing coil 112 in response to commands from the control circuits 117 and 118 on the basis of a tracking signal and a focusing signal which are detected by the photoelectric converting elements 115 and 116, respectively, so that the objective lens 110 is moved and the AT and AF are executed. On the other hand, reference numeral 119 denotes a system controller to control a recording and reproducing apparatus and 120 indicates a group of various control signals which are output from the system controller 119. Although signals other than signals 120 are also output from the controller 119, they are not shown here. Reference numeral 121 denotes an optical head and 122 indicates a drive motor to move the optical head in the direction indicated by arrow u in FIG. 1.

The light beam from the light source 107 is converted to the parallel light by the collimating lens 108 and is transmitted through the beam splitter 109. Thereafter, the light is focused onto the recording track on the optical card 101 by the objective lens 110. The light reflected by the recording track is again transmitted through the beam splitter 109 and is divided into two light beams by a beam splitter 109'. The divided light beams are respectively focused onto the photoelectric converting element 115 for tracking signal detection and the photoelectric converting element 116 for focusing signal detection by the condenser lenses 113 and 114. Electric signals from the photoelectric converting elements 115 and 116 are used as a tracking error signal and a focusing error signal by the tracking controlling circuit 117 and the focusing controlling circuit 118, respectively. By allowing currents to flow through the tracking coil 111 and focusing coil 112, the objective lens 110 is moved and the AT and AF are executed.

FIG. 3 is a detailed diagram of the tracking controlling circuit 117.

In the diagram, the same parts and components as those in FIG. 2 are designated by the same reference numerals. A tracking error signal 203 detected by the photoelectric converting element 115 is transmitted through a phase compensating circuit 202 and a limiter 301 and is amplified by an operational amplifier 302 and is input to the tracking coil 111. The limiter 301 is used to limit the maximum current which flows through the coil 111. The maximum current is limited a to prevent a breakage of the actuators due to the inflow of an overcurrent or to prevent unnecessary motion of the objective lens when noises appear in the signal 203 due to dust or scratches on the medium.

However, in the foregoing conventional apparatus, even in the case when a variation in sensitivity of the actuators occurs, depending on the type of apparatuses used, the maximum current is constant. Therefore, the moving distance of the objective lens due to the limited current differs, dependent on each of the actuators. That is, in the case of the actuator having a high sensitivity, the moving distance of the objective lens is large. On the contrary, in the case of the actuator of a low sensitivity, the moving distance is small. Therefore, large noises appear in the signal 203 due to dust or scratches on the medium. A variation in movement amount of the objective lens occurs when the current is limited depending on the type of apparatus used. This presents a problem such that in a certain apparatus, the AT is effective notwithstanding the existence of a large amount of dust, but in another apparatus, the AT is made ineffective, even by the existence of a small amount of dust, and in this manner, the quality of the apparatus becomes unstable.

SUMMARY OF THE INVENTION

It is an object of the present invention to solve the problems in the conventional techniques mentioned above and to provide an optical information processing apparatus in which even if there is a variation in sensitivity of the actuators of the apparatuses, a limit range of the movement of a light spot by a limiter can be adjusted to be constant.

The above object of the invention is accomplished by an optical information processing apparatus comprising: means for scanning an information track on an optical recording medium by a focused light spot; means for moving the light spot in the direction of an optical axis and/or the direction which is perpendicular to the optical axis with respect to the information track; means for detecting focusing and/or tracking error signals of the light spot with respect to the information track control means for returning the detected error signal to the moving means; means for electrically limiting a moving range of the light spot; and means for adjusting a range of movement of the light spot which is limited by the control means in accordance with a sensitivity of the moving means.

DETAILED DESCRIPTION OF THE PREFERRED EMBODIMENTS

Figure 1:
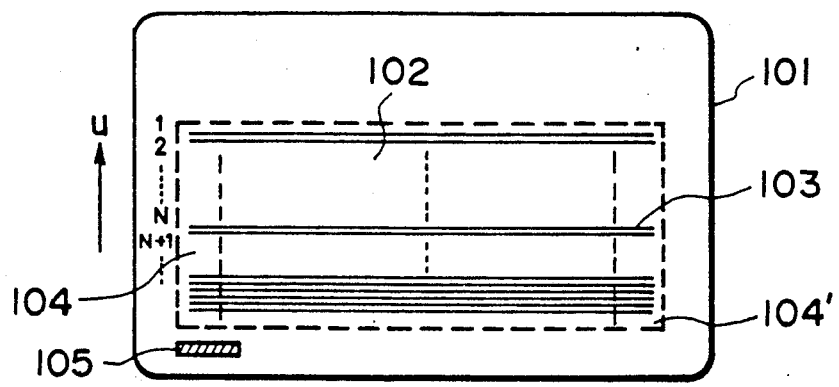
FIG. 1 is a schematic plan view showing an example of a conventional optical card.
Figure 2:
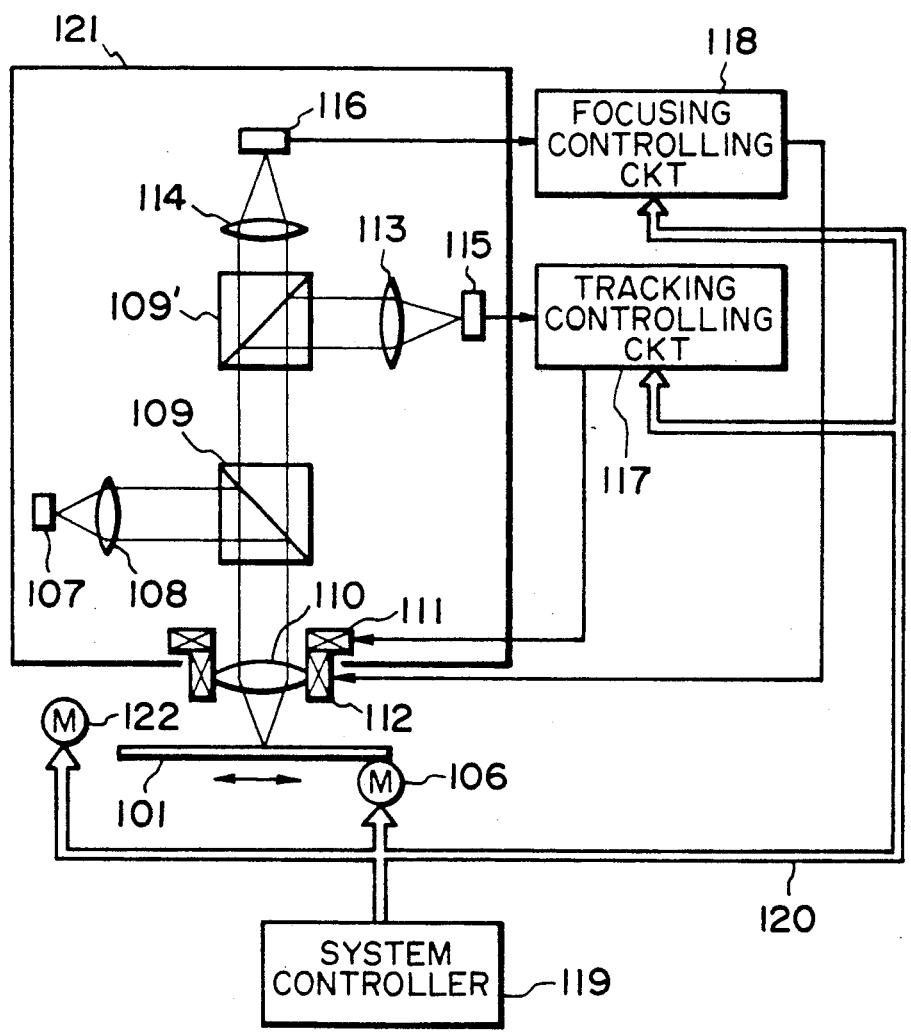
FIG. 2 is a schematic diagram showing an example of a conventional optical information recording and reproducing apparatus using the optical card shown in FIG. 1.
Figure 3:
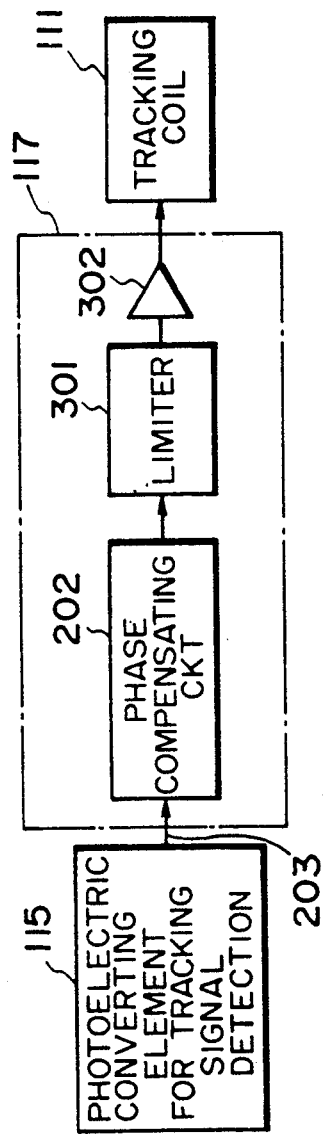
FIG. 3 is a block diagram showing an example of a construction of a conventional tracking controlling circuit which is used in the apparatus shown in FIG. 2.
Figure 4:
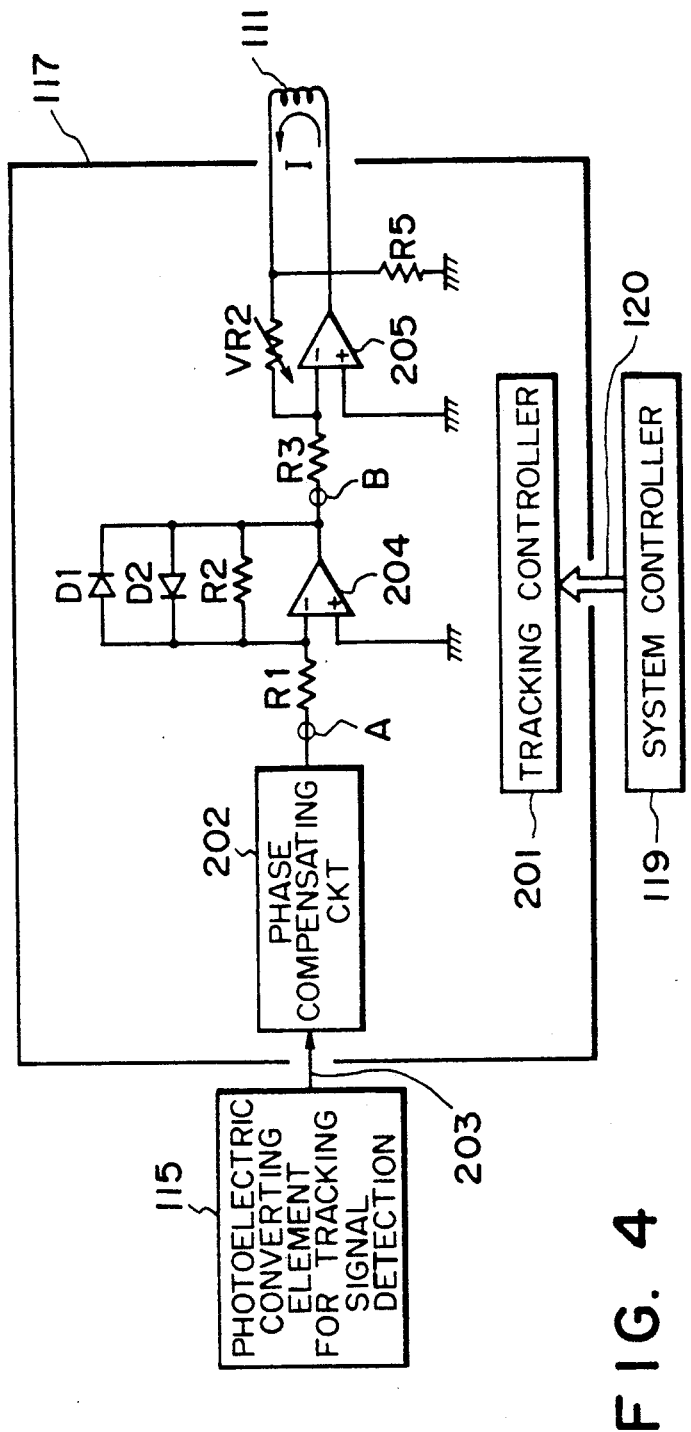
FIG. 4 is a block diagram showing an embodiment of a tracking controlling circuit which is used in the apparatus of the present invention.

FIG. 4 is a block diagram showing an embodiment of a tracking controlling circuit which is used in an optical information processing apparatus of the present invention. In the apparatus of the invention, the construction other than the tracking controlling circuit is the same as that in the example of FIG. 2. Therefore, in FIG. 4, the same parts and components as those in FIG. 2 are designated by the same reference numerals.

In FIG. 4, reference numeral 202 denotes the phase compensating circuit; 201 indicates a tracking controller which receives signals from the system controller 119 and controls the whole tracking controlling circuit 117; 204 and 205 indicate operational amplifiers; $R_1$, $R_2$, $R_3$, and $R_5$ indicate resistors; $VR_2$ indicates a variable resistor; and $D_1$ and $D_2$ indicate diodes.

The tracking signal 203 which is detected by the photoelectric converting element 115 is first input to the phase compensating circuit 202 to stabilize the AT servo and is transmitted through a circuit constructed by the operational amplifier 204 and is input to a circuit constructed by the operational amplifier 205. Thus, current flows through the tracking coil 111. The diodes $D_1$ and $D_2$ are provided to limit the maximum current which is allowed to flow through the coil 111. For instance, it is assumed that $$R_1 = R_3 = VR_2 = 10 \ k\Omega$$

$$R_5 = 1 \Omega$$

and the voltages in the forward direction of $D_1$ and $D_2$ are set to 0.7 V, respectively. When noises appear in the signal 203 and the voltage at point A becomes larger than 0.7 V, the voltage at point B is held to 0.7 V by the function of the limiter of the diode $D_1$ or $D_2$.

On the other hand, the variable resistor $VR_2$ is provided to correct a variation in the sensitivity of the actuators. A sensitivity S of the actuator is expressed as follows.

$$S = \frac{\text{movement amount of the objective lens 10 when a current I flows}}{\text{current I flowing through the coil 111}}$$

There is also a variation in sensitivity S even among the same kind of actuators. Therefore, if the sensitivity variation is not corrected, a variation in AT servo gain also occurs depending on the actuator used, so that an apparatus in which the AT servo does not stably function is manufactured. Therefore, when the actuator of a high sensitivity is used, by setting the resistance value of $VR_2$ to a small value, the amplification factor of the electric circuit is reduced. Conversely, when the actuator of a low sensitivity is used, by setting the resistance value of $VR_2$ to a large value, the amplification factor of the electric circuit is increased. Consequently, the AT servo gain of any apparatus is set to the same value.

The variable resistor $VR_2$ also functions to adjust the movement amount of the objective lens which is limited by the limiter comprising diodes $D_1$ and $D_2$. For instance, when the actuator having a standard sensitivity is used, if it is assumed that $VR_2 = 10 \ k\Omega$, noises appear in the signal 203 and the voltage at point A is larger than 0.7 V, so that the voltage at point B is held to 0.7 V as mentioned above and the current flowing through the coil 111 is set to 0.7 A. For instance, when the actuator having a sensitivity which is twice as high as the standard sensitivity is used, the amplification factor of the electric circuit needs to be reduced by one half in order to make the AT servo gain constant. The resistance value of $VR_2$ in this example is adjusted to 5 $k\Omega$. At this time, the limit current value is set to 0.35 A. Although the current value differs, since half the current flows through the coil of the actuator of the sensitivity which is twice as high as the standard sensitivity, the movement amount of the objective lens is equal to the movement amount of the objective lens of the actuator having the standard sensitivity.

As described above, according to the present invention, even when there is a variation in sensitivity among the actuators, the movement amounts of the objective lenses can be equalized. Thus, it is possible to prevent a variation in movement amount of the objective lens depending on the apparatus used, which variation occurs when the current is limited by the appearance of large noises in the signal 203 due to dust or scratches on the medium. Consequently, the quality can be stabilized.

Figure 5:
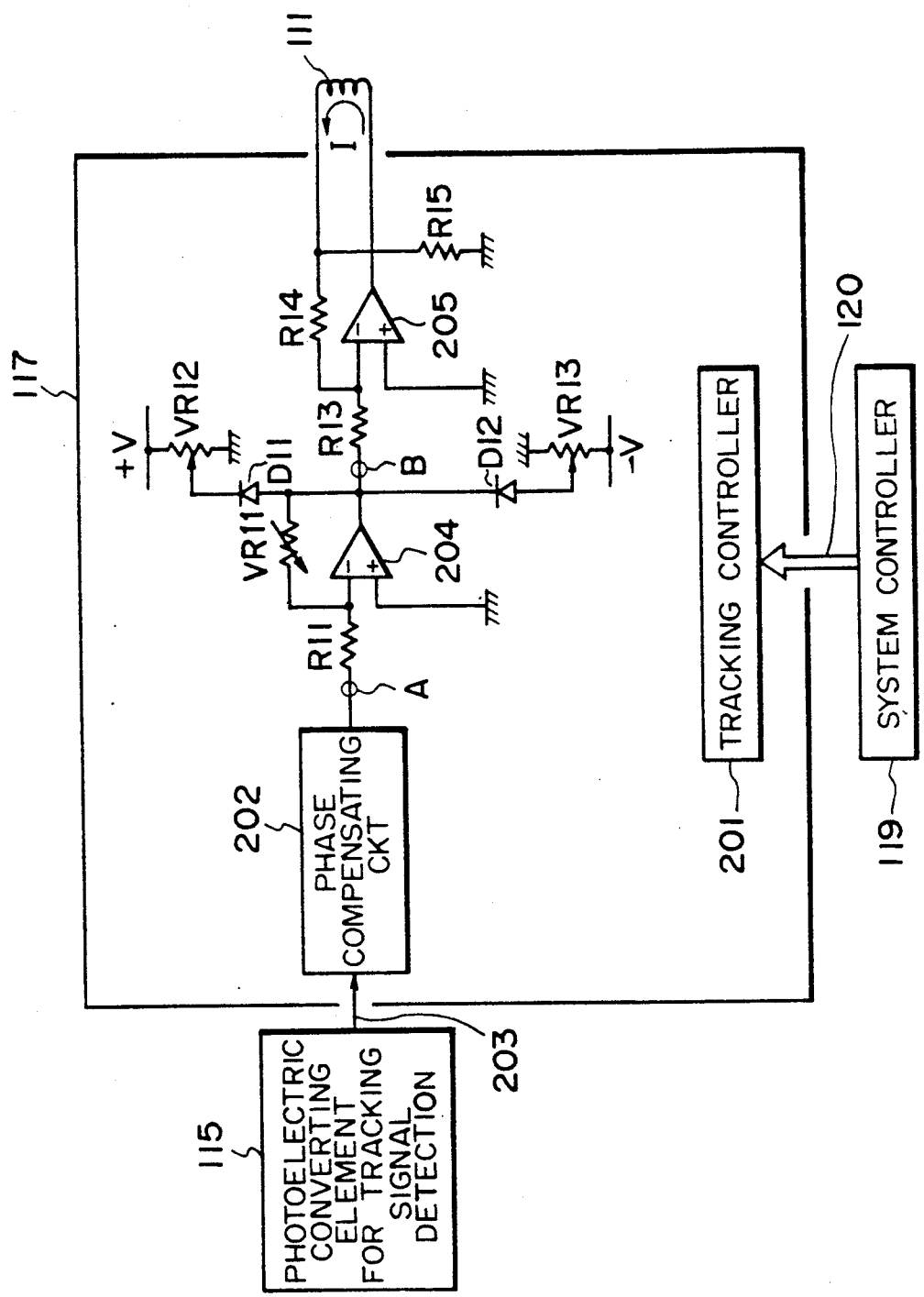
FIG. 5 is a block diagram showing another embodiment of a tracking controlling circuit for use in the present invention.

FIG. 5 is a block diagram showing another embodiment of a tracking controlling circuit which is used in the invention. In FIG. 5, the same parts and components as those in FIG. 4 are designated by the same reference numerals and their detailed descriptions are omitted. In the example of FIG. 4, the variation among the actuators has been corrected by providing the gain adjusting means at a post stage of the limiter. However, in another embodiment, a limit value of the limiter is made variable in place of the gain adjusting means.

In FIG. 5, $R_{11}$ to $R_{15}$ denote resistors; $VR_{11}$ indicates a variable resistor to correct the sensitivity variation of the actuators; $D_{11}$ and $D_{12}$ indicate diodes constructing a limiter; $VR_{12}$ and $VR_{13}$ indicate variable resistors to adjust the voltage at point B when the current is limited; and $+V$ and $-V$ represent DC voltage sources.

It is now assumed that $R_4 = 1$ k$\Omega$ and when an actuator having a standard sensitivity is used, $VR_1 = 100$ k$\Omega$. Variable resistors $VR_{12}$ and $VR_{13}$ are adjusted so as to keep the voltage at point B to 7 V when noises appear in the signal 203 and when the voltage at point A becomes larger than 0.7 V. Practically speaking, the cathode voltage of $D_{11}$ is set to $+6.3$ V by adjusting $VR_{12}$. Similarly, the anode voltage of $D_{12}$ is set to $-6.3$ V by adjusting $VR_{13}$. Thus, the current flowing through the coil 111 is set to 0.7 A.

For instance, when an actuator having a sensitivity which is twice as high as the standard sensitivity is used, it is necessary to reduce the amplification factor of the electric circuit into a half value in order to make the AT servo gain constant. The resistance value of $VR_1$ is adjusted to 50 k$\Omega$. At this time, it is necessary to set the limit current value to 0.35 A. Therefore, $VR_{12}$ and $VR_{13}$ are adjusted so as to keep the voltage at point B to 3.5 V. Practically speaking, the cathode voltage of $D_{11}$ is set to $+2.8$ V by adjusting $VR_{12}$. Similarly, the anode voltage of $D_{12}$ is set to $-2.8$ V by adjusting $VR_{13}$. Thus, the limit current value is set 0.35 A. Although the current value differs, since half the current flows through the coil of the actuator having the sensitivity which is twice as high as the standard sensitivity, the movement amount of the objective lens is equal to the movement amount of the objective lens of the actuator having the standard sensitivity.

Figure 6:
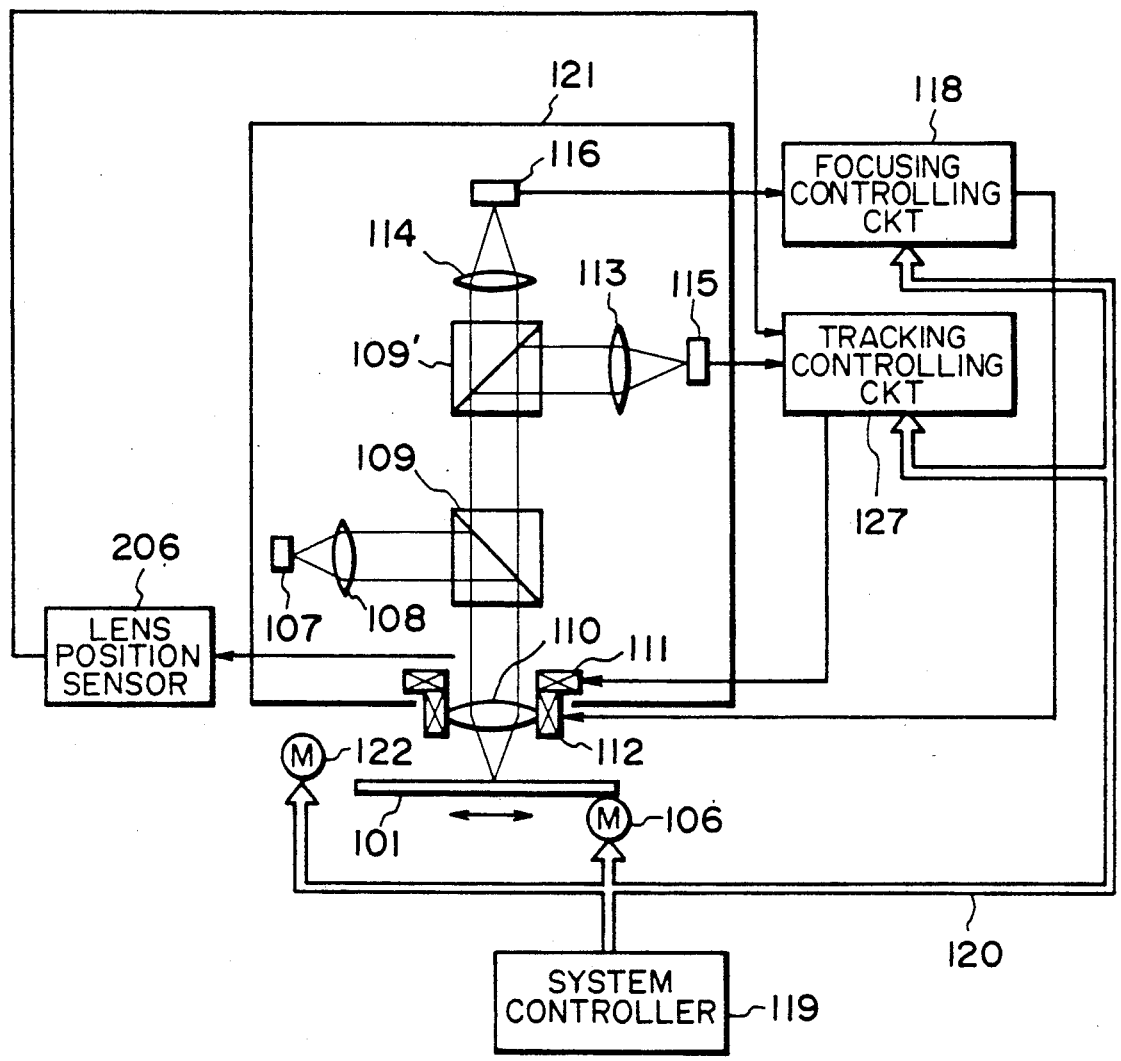
FIG. 6 is a schematic diagram showing yet another embodiment of an apparatus of the present invention.

FIG. 6 is a schematic diagram showing yet another embodiment of an optical information processing apparatus of the invention. In FIG. 6, the same parts and components as those in FIG. 2 are designated by the same reference numerals and their detailed descriptions are omitted.

In FIG. 6, reference numeral 206 denotes a lens position sensor to detect the position in the tracking direction of the objective lens 110 with respect to the optical head 121. A detection signal of the lens position sensor 206 is input to a tracking controlling circuit 127 together with a tracking error signal which is detected by the photoelectric converting element 115. As such a lens position sensor, it is possible to use a sensor disclosed in, for instance, U.S. Pat. No. 4,853,917.

Figure 7:
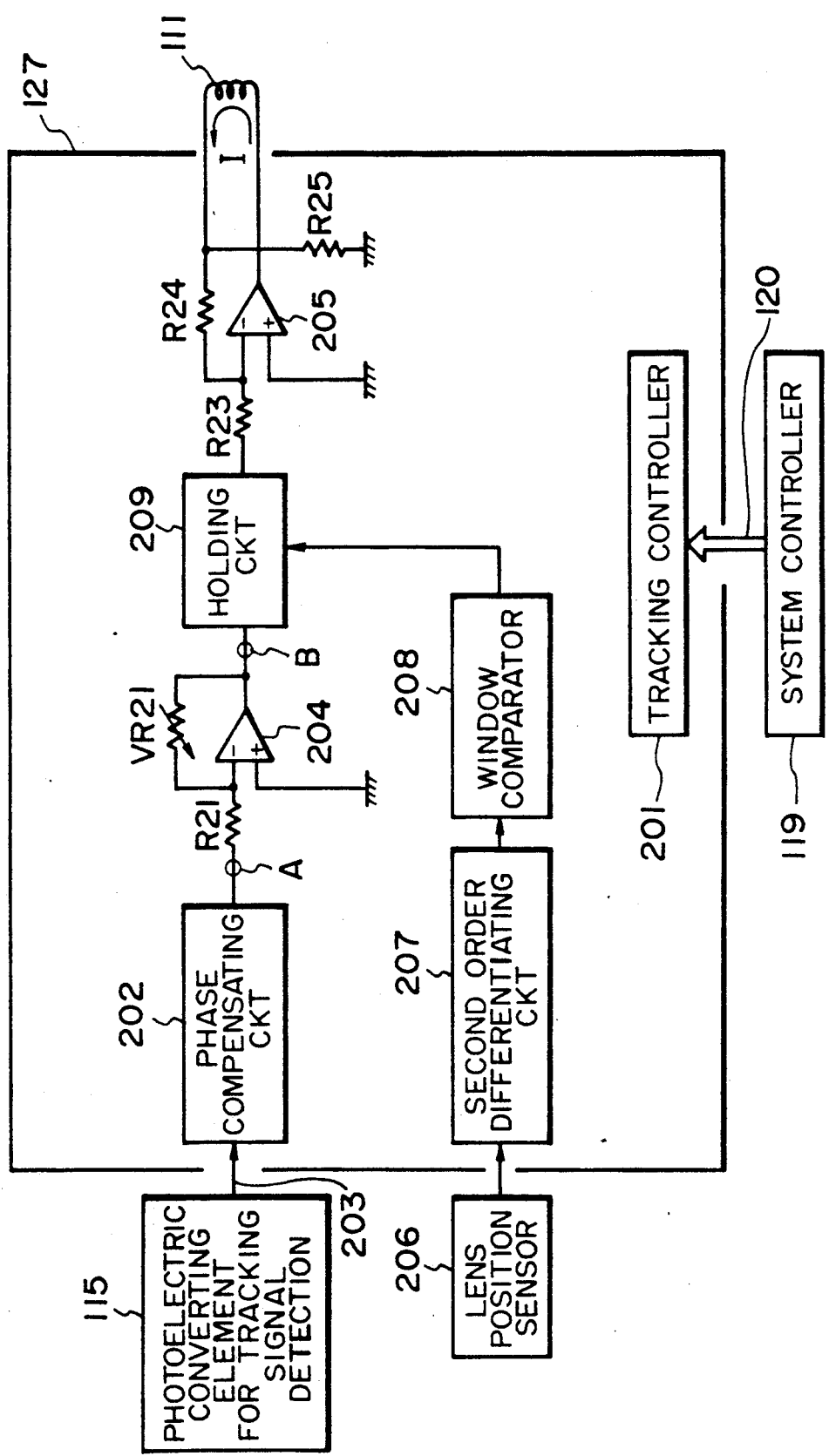
FIG. 7 is a block diagram showing a construction of a tracking controlling circuit in the apparatus shown in FIG. 6.

FIG. 7 is a block diagram showing a construction of the tracking controlling circuit 127 in the apparatus shown in FIG. 6. In FIG. 7, the same parts and components as those in FIGS. 4 and 6 are designated by the same reference numerals. Reference characters $R_{21}$, $R_{23}$, $R_{24}$, and $R_{25}$ denote resistors and $VR_{21}$ indicates a variable resistor to correct a sensitivity variation of the actuators.

In the embodiment, the tracking error signal 203 detected by the photoelectric converting element 115 is transmitted through the phase compensating circuit 202, the operational amplifier 204, a holding circuit 209, and the operational amplifier 205, and is input to the tracking coil 111. On the other hand, an output of the lens position sensor 206 is second-order differentiated by a second order differentiating circuit 207 and becomes a signal indicative of the acceleration (corresponding to the moving acceleration of the light spot) of the objective lens. The acceleration signal is input to a window comparator 208. When the level of the input acceleration signal becomes a predetermined value or higher, the window comparator 208 outputs a signal to instruct the holding circuit 209 to hold. When the signal is received from the window comparator, the holding circuit 209 holds the voltage at point B.

In the construction as mentioned above, when noises are generated in the signal 203, the tracking actuator tries to a great extent to move the objective lens. Then, the acceleration of the objective lens which is detected by the lens position sensor 206 and differentiated by the second order differentiating circuit 207 exceeds the limit value of the window comparator 208. At this time, in accordance with the signal from the window comparator 208, the holding circuit 209 holds the voltage at point B, thereby preventing a larger current from flowing through the tracking coil 111.

In this embodiment, the actual motion of the objective lens is detected and the current flowing through the actuator is limited on the basis of the result of the detection. Therefore, even if there is a sensitivity variation of the actuators, the moving ranges of the objective lenses can be equalized.

In this embodiment, the holding circuit can also be arranged at a different position, for instance, between point A and the resistor $R_{21}$.

Figure 8:
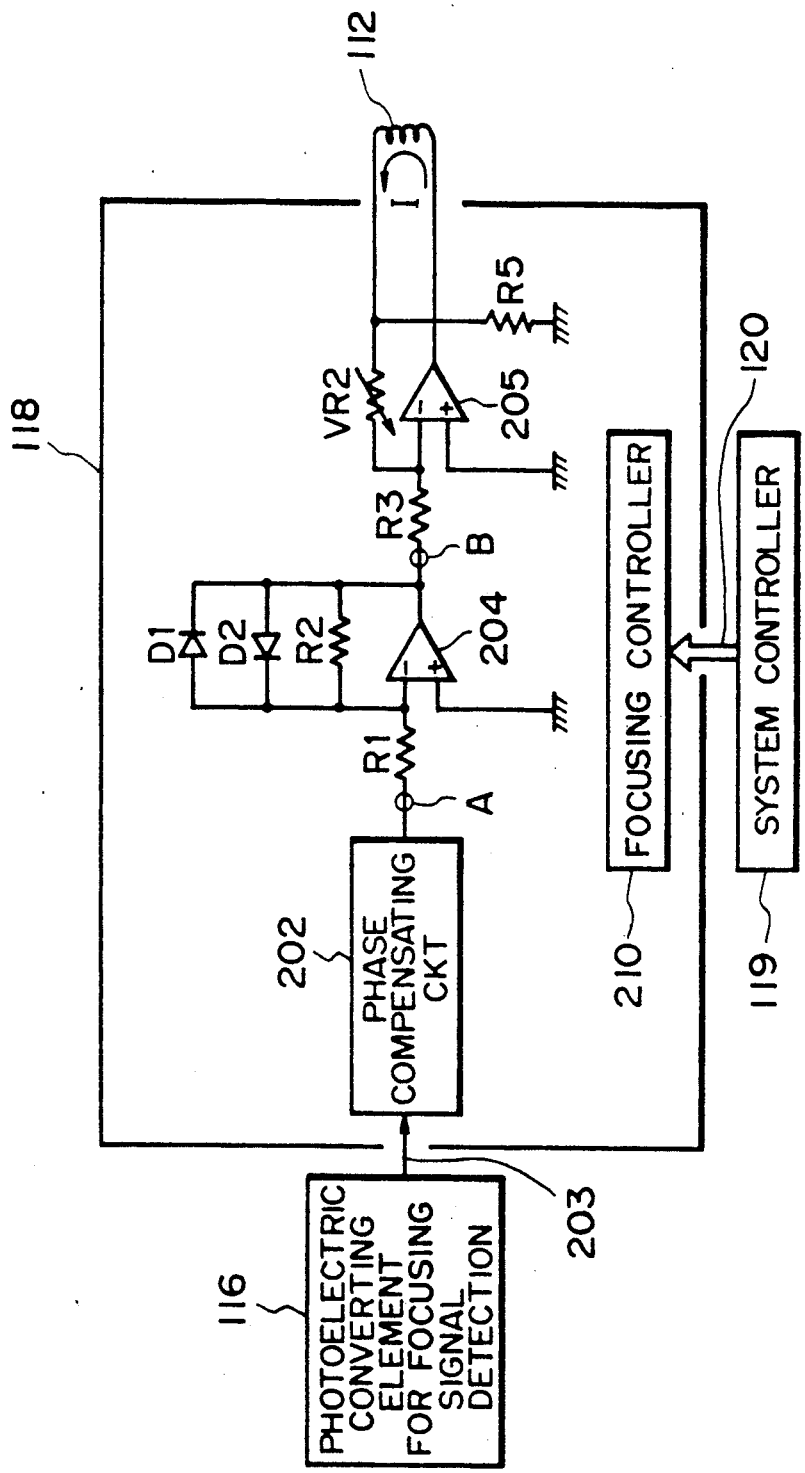
FIG. 8 is a block diagram showing an embodiment of a focusing controlling circuit which is used in the present invention.

Although the embodiments have been described with respect to the tracking controlling circuit, the invention can also be applied to a focusing controlling circuit in a similar manner. For instance, the focusing controlling circuit which is used in the invention can be constructed as shown in FIG. 8. The construction other than the focusing controlling circuit 118 is the same as that in the example of FIG. 2. In FIG. 8, the same parts and components as those in FIGS. 2 and 4 are designated by the same reference numerals and their detailed descriptions are omitted.

In FIG. 8, reference numeral 210 denotes a focusing controller which receives signals from the system controller 119 and controls the whole focusing controlling circuit 118.

As will be apparent from FIG. 8, the focusing controlling circuit for use in the invention can also be constructed in a manner similar to the tracking controlling circuit. On the other hand, the embodiments of FIGS. 5 and 7 may also be directly applied to the focusing controlling circuit. In this case, the photoelectric converting element 115 for tracking signal detection and the tracking coil 111 are replaced by the photoelectric converting element 116 for focusing signal detection and the focusing coil 112. On the other hand, in the example of FIG. 7, the lens position sensor 206 is also readily modified so as to detect the position of the direction (focusing direction) of the optical axis of the objective lens.

The present invention is not limited to the foregoing embodiments, but many modifications and variations are possible within the spirit and scope of the appended claims of the invention. For instance, the shape of the optical recording medium which is used in the apparatus of the invention is not limited to the card shape, but may be set to any of the disk type, tape type, and the like.

What is claimed is:

1. An optical information processing apparatus comprising:
   scanning means for scanning an information track on an optical recording medium by a focused light spot;
   moving means for moving the light spot in at least one of a direction of an optical axis of said scanning means and a direction which is perpendicular to the optical axis with respect to the information track, said moving means having a predetermined sensitivity;
   means for detecting at least one of focusing and tracking error signals of the light spot with respect to the information track and for producing a corresponding detection error signal;
   control means for returning the detection error signal to said moving means;
   means for limiting a range of movement of the light spot; and
   means for adjusting the range of movement of the light spot which is limited by said control means in accordance with the sensitivity of said moving means.

2. An optical information processing apparatus comprising:
   a light source for emitting a light beam;
   an objective lens for focusing the light beam emitted from said light source onto an information track on an optical recording medium;
   means for relatively moving the medium with respect to the light beam;
   an actuator for driving said objective lens in at least one of a direction of an optical axis of said objective lens and a direction which is perpendicular to the optical axis, said actuator having a predetermined sensitivity;
   a detector for detecting at least one of focusing and tracking error signals of the light beam with respect to the information track;
   a controlling circuit for returning the error signal detected by said detector to said actuator;
   a limiter provided in the controlling circuit for limiting a range of movement of said objective lens; and
   an adjusting circuit for adjusting the range of movement of said objective lens which is limited by the limiter in accordance with the sensitivity of said actuator.

3. An apparatus according to claim 2, wherein said adjusting circuit and said limiter comprise:
   an amplifier for amplifying the signal returning to said actuator as an input;
   a circuit for adjusting gain of said amplifier in accordance with the sensitivity of the actuator; and
   a circuit for limiting a level of the signal returning to said actuator through said amplifier to a value within a predetermined range.

4. An apparatus according to claim 2, wherein said adjusting circuit and said limiter comprise:
   an amplifier for amplifying a signal input to said actuator;
   a circuit for adjusting gain of said amplifier in accordance with the sensitivity of the actuator;
   a limiting circuit for limiting a level of the signal output from said amplifier to said actuator; and
   a circuit for adjusting a limit value of said limiting circuit in accordance with the sensitivity of said actuator.

5. An apparatus according to claim 2, wherein said detector comprises a photoelectric converting element for receiving a light beam reflected by the medium.

6. An optical information processing apparatus comprising:
   a light source for emitting a light beam;
   a lens for focusing the light beam emitted from said light source onto an information track on an optical recording medium;
   means for relatively moving the medium with respect to the light beam;
   an actuator for driving said lens in at least one of a direction of an optical axis of said lens and a direction which is perpendicular to the optical axis, said actuator having a predetermined sensitivity;
   a detector for detecting at least one of focusing and tracking error signals of the light beam with respect to the information track;
   a controlling circuit for returning the error signal detected by said detector to said actuator;
   an instructing circuit for setting a predetermined range of movement of said lens and for monitoring movement of said lens with respect tot he predetermined range and for outputting a signal prior to a time when said lens exceeds the predetermined range; and
   a holding circuit arranged in said controlling circuit for receiving the output signal from said instructing circuit and for holding the error signal which is input to said actuator.

7. An apparatus according to claim 6, wherein said instructing circuit comprises means for detecting acceleration of said lens and means for outputting the signal when the detected acceleration exceeds a predetermined range.

8. An apparatus according to claim 7, wherein said instructing circuit comprises:
   a sensor for detecting a position of said lens;
   a differentiating circuit for second-order differentiating an output of said sensor; and
   a window comparator for comparing an output of said differentiating circuit with a predetermined value.

9. An apparatus according to claim 6, wherein said controlling circuit includes:
   an amplifier for amplifying the signal input to said actuator; and
   a circuit for adjusting gain of said amplifier in accordance with the sensitivity of said actuator.

10. An apparatus according to claim 6, wherein said detector comprises a photoelectric converting element for detecting a light beam reflected by the medium.

* * * * *

UNITED STATES PATENT AND TRADEMARK OFFICE
CERTIFICATE OF CORRECTION

PATENT NO. : 5,029,151
DATED : July 2, 1990
INVENTOR(S) : Satoshi Shikichi

It is certified that error appears in the above-identified patent and that said Letters Patent is hereby corrected as shown below:

COLUMN 1

Line 54, "arrow" should read --arrow;--.

COLUMN 2

Line 57, "actuator of a" should read --actuator having a--.

COLUMN 3

Line 11, "comprising" should read --that includes--;
Line 18, "track" should read --track;--; and
Line 36, "which is," should read --which is--.

COLUMN 4

Line 24, "follows." should read --follows:--.

UNITED STATES PATENT AND TRADEMARK OFFICE
CERTIFICATE OF CORRECTION

PATENT NO. : 5,029,151

DATED : July 2, 1990

INVENTOR(S) : Satoshi Shikichi

It is certified that error appears in the above-identified patent and that said Letters Patent is hereby corrected as shown below:

COLUMN 8

Line 37, "tot he" should read --to the --.

Signed and Sealed this

Fifth Day of January, 1993

*Attest:*

DOUGLAS B. COMER

*Attesting Officer*    Acting Commissioner of Patents and Trademarks